US00RE35649E

United States Patent [19]

Baer

[11] E Patent Number: Re. 35,649

[45] Reissued Date of Patent: Nov. 4, 1997

[54] METHOD AND APPARATUS FOR THE CONTROL OF A MULTIPLE OF DOOR ACCESSIBLE NEWSPAPER VENDING CABINETS WITH A SINGLE VEND CONTROL MECHANISM OPERATING REMOTE DOOR LATCHES

[75] Inventor: Scott D. Baer, Shiner, Tex.

[73] Assignee: Kaspar Wire Works, Inc., Shiner, Tex.

[21] Appl. No.: 740,750

[22] Filed: Nov. 1, 1996

Related U.S. Patent Documents

Reissue of:

[64] Patent No.: 5,360,093
Issued: Nov. 1, 1994
Appl. No.: 893,738
Filed: Jun. 5, 1992

[51] Int. Cl.[6] ..... G07F 7/04; G07F 11/04

[52] U.S. Cl. ..... 194/206; 194/217; 194/248; 194/350; D20/6

[58] Field of Search ..... 194/206, 207, 194/217, 218, 233, 248, 350; D20/6; 221/92, 129, 130, 131, 155

[56] References Cited

U.S. PATENT DOCUMENTS

| | | | |
|---|---|---|---|
| 1,632,838 | 6/1927 | Higgins | 194/248 |
| 2,273,814 | 2/1942 | Bartel et al. | 221/130 |
| 4,257,531 | 3/1981 | Kimura et al. | 221/129 X |
| 4,311,227 | 1/1982 | Watkins | 194/206 |
| 4,386,691 | 6/1983 | Voegeli | 194/220 |
| 4,787,687 | 11/1988 | Merl | 312/100 |
| 4,927,051 | 5/1990 | Falk et al. | 221/12 |
| 4,967,896 | 11/1990 | Hara | 194/217 |
| 5,036,966 | 8/1991 | Kaspar et al. | 194/217 |

FOREIGN PATENT DOCUMENTS

| | | | |
|---|---|---|---|
| 2157820 | 2/1973 | Germany | 194/350 |

*Primary Examiner*—F. J. Bartuska

[57] ABSTRACT

A method and apparatus to control the selective opening of one of a multiple of door accessible newspaper vending cabinets (6a–6e) through a single vend control mechanism (7). The method provides for signaling a selected door from a multiple of doors (18a–18e) to unlock when the proper total denomination of coins or monetary credits has been inserted into the vend control mechanism (7). The apparatus provides for an electronic coin totalizer (14) and/or a bill acceptor (16), and/or a debit/credit card acceptor (17), and a central processing unit (CPU) (10) to receive and process signals relating to total monies received into the vend control mechanism (7) and to selectively unlock one of a multiple of door-accessible cabinets (6a–6e), the cabinets containing different newspapers.

22 Claims, 5 Drawing Sheets

METHOD AND APPARATUS FOR THE CONTROL OF A MULTIPLE OF DOOR ACCESSIBLE NEWSPAPER VENDING CABINETS WITH A SINGLE VEND CONTROL MECHANISM OPERATING REMOTE DOOR LATCHES

Matter enclosed in heavy brackets [ ] appears in the original patent but forms no part of this reissue specification; matter printed in italics indicates the additions made by reissue.

FIELD OF THE INVENTION

The present invention relates generally to multiple-cabinet newspaper vending machines and more particularly to a method and apparatus for totalizing monies or credits received in a single, central mechanism and to control the operation of individual doors to the multiple cabinets and, therefore, provide controlled access to the newspapers therein.

BACKGROUND

Generally, newspaper vending machines presently available are of the "stand-alone" type. Stand-alone coin controlled newspaper vending machines typically generally comprise a durable metal cabinet, usually rectangular in shape, for containing a quantity of newspapers. Access to the cabinet is controlled by a hinged door. The door is latched closed by a locking mechanism, the locking mechanism being controlled by a coin control mechanism for receiving coins. The coin control mechanism unlatches the door when coins totaling a pre-selected sum reflecting the cost of that day's edition, are inserted therein.

Typical of the stand-alone type vending machines is that disclosed in U.S. Pat. Des. No. 273,021 (Chalabian 1984). This patent illustrates the use of a rectangular metal cabinet accessible through a coin-controlled, latch-operated hinged door. Occasionally, such cabinets may be stacked or grouped as in U.S. Pat. Des. No. 287,605 (Chalabian 1987) which discloses two metal cabinets for enclosing newspapers, the cabinets being stacked one on top of the other. However, each of the cabinets in Chalabian 1987 has a separate coin control mechanism for operating each of the separate doors. That is, the '605 patent illustrates two separate cabinets, stacked one on top of the other, each cabinet having its own coin control mechanism for operating each door. Illustrative of other approaches to vending machines in general are the following.

U.S. Pat. No. 4,787,687 (Merl 1988) discloses a modular, open front, open top, box-like cabinet for mounting on a pedestal, and for enclosing newspapers therein. The cabinets may be stacked one on top of the other. However, Merl provides for free access to the cabinets by a hinged door and thus obviates the need for an individual and/or a centralized coin control/latching mechanism to prevent unauthorized access to the cabinets. The Merl design provides for a modular cluster of individual cabinets being interlocked together.

U.S. Pat. No. 4,927,051 (Falk 1990) discloses a multi-product merchandising machine that is divided by walls into separate compartments for separate products. These compartments may be accessed by doors associated with each horizontal level. The machine also comprises a locking system to prevent more than one door from being opened at one time. This machine utilizes a single coin mechanism to control the vend of a multiplicity of different products. It discloses a rotating "drum and shelf" arrangement that is appropriate for perishable food products. The price of each of the products to be vended may be independently selected and set by the machine operator. The coin control mechanism described is capable of keeping track of the products that have been vended, U.S. Pat No. 4,967,896 (Hara 1990) discloses an automatic vending machine which includes a price memory device. The price memory device stores product pricing information, calculates the amount of coinage necessary for a particular product, and determines the proper change. The Hara device is capable of addressing and determining the selling prices of multiplicity of items within the same machine.

U.S. Pat. No. 4,386,691 (Voegeli 1983) discloses an electronically controlled coin-operated latch mechanism that allows an electromagnetically actuated hook to be pivoted away from engagement with a latching member that holds the vending door in a locked position. The electromagnet is momentarily energized upon insertion of coins meeting the predetermined total for the vend. Neither multiple door openings nor a single module capable of operating multiple remote doors are disclosed by Voegeli.

U.S. Pat. No. 4,354,613 (Desai et al. 1982) discloses a microprocessor-based vending apparatus that includes a plurality of individual separately-driven dispensing assemblies. The microprocessor-based central processing unit scans the dispensing assemblies to determine if there are any malfunctioning or disabled assemblies. The central processing unit disclosed in Desai has a control means that scans the individual dispensing means and will connect a power supply with the selected dispensing means if the dispensing means is not malfunctioning. Desai also discloses a memory device for retaining pertinent data that may include an inventory of the items dispensed, the number of coins of each denomination accumulated in the vending apparatus, as well as other relevant vend status information. Such information may then either be displayed on demand or communicated to a remote location by a direct line or by wireless transmission. The Desai invention does not provide for a single modular unit servicing a number of remotely-operated doors.

U.S. Pat. No. 4,350,238 (Shah et al. 1982) discloses a data acquisition unit that will receive and record the number of vends for each of a number of different products corresponding to various selection switches on the vending machine. A display can be activated to show the selection number and corresponding price data.

It is apparent from the prior art, that there are well known means to electronically detect the denomination and validity of coins and bills, to totalize these monies as received by a control mechanism, and to signal an electronically-activated latch mechanism releasing a door and providing access to newspapers inside. It is also well known to electronically store data related to the timing and number of sales (door openings). Further, it is well known to signal a preselected vend door when money totalling the sum prescribed for the item is inserted into the machine. Finally, it is known in the art to provide a frame or base upon which a number of similarly dimensioned cabinets may be stacked, each with its own coin control mechanism and each operating independently of one another. What does not exist and what is desirable in the newspaper industry is a vending rack and single coin control module capable of performing all of these functions while controlling access to a multiple of modular, door-accessible cabinets. The invention of the present application provides such a device.

A single rack for containing a multiplicity of modular cabinets has a number of advantages over stand-alone cabinets. Aesthetically, it removes the unsightly cluttered appearance now so prevalent along "newspaper rack row" typically found at crowded street corners and busy airports. A modular cabinet rack would have reduced physical space requirements, especially when the rack incorporates a vertical stacking of the cabinets. Such a modular rack would also provide for additional safety as stand-alone machines are easier to make off with.

Frequently, the most expensive part of a newspaper vending machine is the coin control mechanism typically incorporated in each cabinet. A single newspaper rack that contained a multiplicity of modular cabinets with a single vend or coin control mechanism would greatly reduce the costs associated with any specific newspaper cabinet. While there would be some small additional expense associated with the means of controlling a multiplicity of cabinets, this small cost would be more than made up by the elimination of the need for four or more additional vend control mechanisms. Thus, for example, in an array of five newspaper vending cabinets, a single vend control mechanism could serve the functions of all five cabinets thereby eliminating the costs of four vend or coin control mechanisms.

In addition to the initial cost savings, there are likewise ongoing cost savings associated with the maintenance of the coin or vend control mechanism. While the centralized vend control unit might experience greater use due to its association with a plurality of cabinets, maintenance would nonetheless be isolated to a single unit rather than the five or more that previously would have required maintenance. Likewise, any upgrades to the centralized vend control mechanism programming or information collection functions could be achieved at one time through the central unit rather than the reprogramming or restructuring of the functions of a multiplicity of vend control units.

Thus, a single rack that incorporates a multiplicity of door-operated cabinet modules (either built-in or removable) would overcome many disadvantages of a stand-alone cabinet. What is needed is an apparatus and method that provides a single vend control mechanism to receive and totalize coins bills, or credits and to selectively access one of a plurality of cabinet modules. That is, what is needed is a newspaper vending machine having a rack containing a multiplicity of door accessible cabinets with latch mechanisms on the doors controlled by a single centralized vend control mechanism.

SUMMARY OF THE INVENTION

The device of the present invention provides for a newspaper vending machine capable of selectively vending one of at least two different newspapers within a rack, the newspapers having either the same or different prices, the rack having walls defining a multiplicity of compartments or, alternately, having a frame, with at least two modular cabinets capable of receiving within the walls thereof a stack of newspapers, each of said modular cabinets to fit snugly within the structure of the rack. A single, centralized vend control module accepts, totalizes, and stores money or credits and signals a remotely-located door to unlatch upon receipt of sufficient money or credits.

An operative door on each of the cabinets provides access to the interior of the cabinets, the door being moveable between a closed position and an open position. A latch for unlocking the door in the closed position has a release means responsive to an electronic signal generated by the vend control module.

The invention further provides a means for selectively setting the total money or credits required for each particular door that must be inserted into the vend-control module. That total must be reached before signaling the release means. This door control is accomplished by control module that is dimensioned to fit within a compartment of the rack, the vend control module having a central processing unit capable of receiving and totalizing money or credits received therein and capable of signaling the selected cabinet containing the desired newspaper when sufficient money has been inserted into the vending machine to cover the price preselected by the price setting means.

BRIEF DESCRIPTION OF THE DRAWINGS

FIG. 1 further illustrates the use of a vend control module dimensioned to fit within the same space within the rack that is dimensioned for the receipt of a newspaper cabinet therein.

DETAILED DESCRIPTION OF PREFERRED EMBODIMENT

Figure 1:
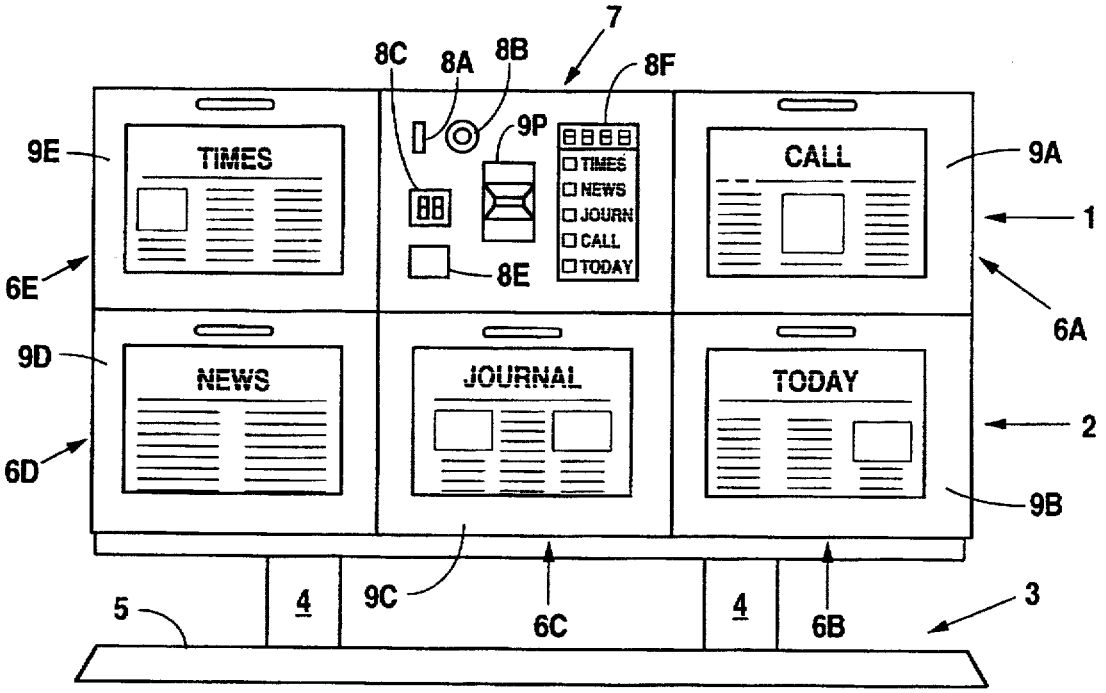
FIG. 1 is a front elevational view of the rack of the present invention illustrating the multiple compartments of the rack, each compartment capable of receiving a cabinet therein.

FIG. 1 generally illustrates the physical environment to which Applicant's invention relates. More specifically, FIG. 1 discloses a rack (1) divided up into numerous (in this case six) similarly dimensioned compartments. That is, rack (1) is comprised of walls defining a body (2) which rests on pedestal (3) which is comprised of legs (4) projecting perpendicularly from mounting base (5).

As can be appreciated from FIG. 1, the present invention describes a rack having compartments into which numerous cabinets (6a–e) can be inserted or otherwise defined. A vend control module (7) of the present invention is dimensioned to be insertable into one of the multiple compartments of body (2). As illustrated in FIG. 1, vend control module (7) is preferably located in the "12:00 o'clock" position and, clockwise therefrom are cabinets containing five different newspapers, for illustrative purposes: the "Call," "Today," "Journal," "News," and "Times." Each of these cabinets (6a–6e) has a handle operated door (9a–9e respectively). Doors (9a–9e) provide access to the interior of each cabinet (6a–6e), thereby allowing the customer to remove the paper from the cabinet. Thus, the rack of the present invention provides for the insertion of similarly dimensioned modular cabinets and a vend control module into a rack providing the customer with a single vend control module into which the customer can insert coinage, paper money, or debit/credit cards and select any one of a multiplicity of different papers.

As illustrated in FIG. 1, vend control module (7) has on a front face thereof a coin slot (8a) for the receipt of coinage of different denominations and optionally, bill acceptor (8d) of the type that may accept either dollar bills, or bills of more than one denomination. Also on the outer face of vend control module (7) is coin return slot (8e). Alternately or in addition, vend control module (7) may have on a front face thereof a card slot (not shown in FIG. 1) for the receipt of a debit or credit card magnetically encoded with information appropriate for financial transactions. The debit/credit card slot could be configured according to any of the standard "insertable" card slots or "swipe" card slots.

In addition, control module (7) has accessible on the front face thereof button select panel (8f) which provides the consumer with a means of selecting one of the multiplicity of newspapers, in this case, contained in cabinets (6a–6e). Display (8c) will illustrate the money total required as set forth more fully below. Finally, coin interrupt button (8b), also located on the front face of vend-control module (7) allows the consumer to dear the transaction as more fully described below.

As can be appreciated from FIG. 1, vend control module (7) of the present invention is dimensioned substantially the same as newspaper-containing cabinets (6a–6e) and therefore can be positioned or otherwise located in a compartment within rack (1) other than that illustrated in FIG. 1.

Thus, FIG. 1 illustrates a multiplicity of modular cabinets (6a–6e) all contained within a single rack (1) and all operated by a single vend control module (7) dimensioned similarly to the modular cabinets (6a–6e).

It would be helpful at this point to describe generally how the consumer operates the device of the present invention. The consumer begins by inserting coins, bills, or a debit/credit card into control module (7). This action will "wake up" the previously dormant electronic circuit (described in more detail below). The consumer will then make a selection by pressing the desired button on button select panel (8e). Vend control module (7) will send a signal to the selected door (9a–9e) unlocking the same, as long as sufficient money (any combination of coinage and/or bills or debits/credits) has been inserted. Upon opening the appropriate door (9a–9e), the consumer will be provided access to the selected paper, and a signal will be transmitted from selected door (9a–9e) to vend-control module (7) to clear and record the transaction. Thus, all money transactions occur in central vend-control module (7) and each vend is recorded therein as described below, when necessary change may be given in response to excess money having been deposited.

Figure 2:
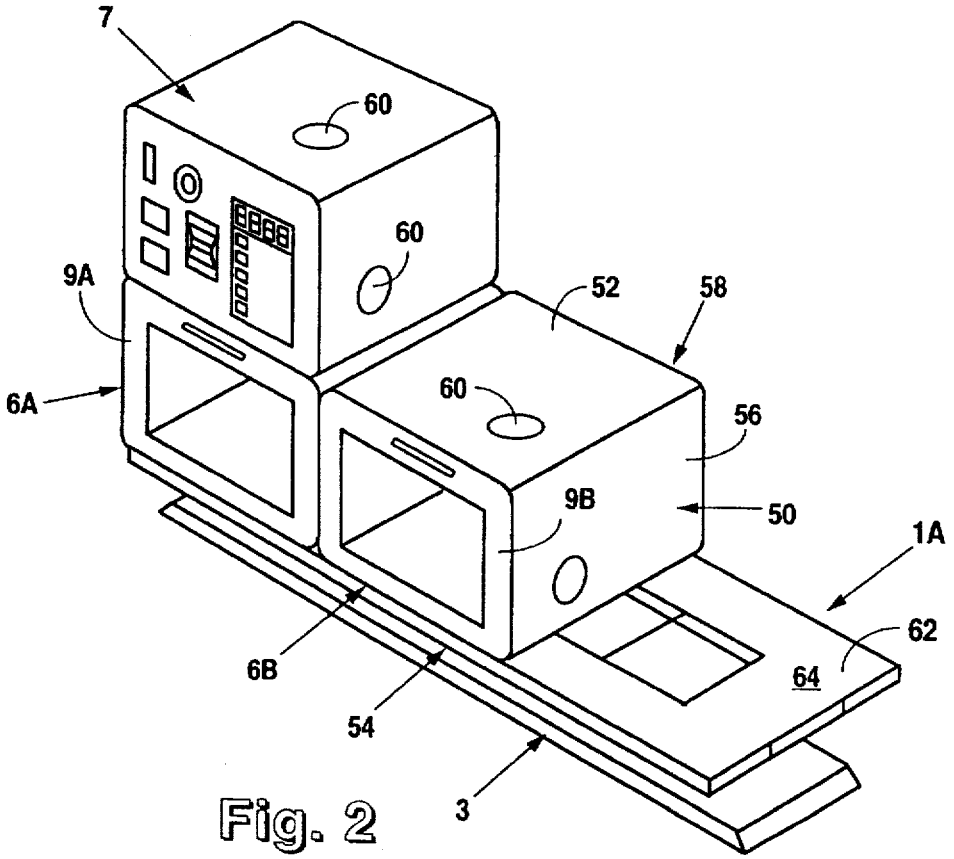
FIG. 2 illustrates another preferred embodiment of the present invention having a frame for mounting modular cabinets and a vend control module dimensioned similar to the cabinets, for controlling the operation of the doors of the cabinets.

FIG. 2 illustrates an alternate preferred embodiment of the present invention wherein each cabinet (50) is modular in nature, having side walls (56), top wall (52), bottom wall (54), and rear wall (55). That is, each cabinet (50) is defined by walls establishing an enclosure accessible by door (9a–9b), the unlatching of which is controlled operated from a remote, modular, vend-control module (7), dimensioned substantially the same as cabinets (50). The embodiment illustrated in FIG. 2 differs from the previous embodiment in that cabinets (50) are placed on frame (1a) and stacked or laid next to one another like bread on a supermarket display shelf. Cabinets (50) have defined in one or more walls thereof access ports (60) for routing conduit and electrical wiring (not shown) from vend-control module (7) to one or more remote cabinets (50).

As can be seen in FIG. 2, frame (1a) sits on pedestal (3) and is comprised of perimeter (62) having cross braces (64). Thus frame (1a) provides a base on which may be mounted a cabinet, or cabinets (50). Cabinets (50) are affixed to frame (1a) in a conventional manner, such as by nut-and-bolt fasteners. It will be appreciated from the illustration set forth in FIG. 2 that access ports (60) may be provided through walls (52), (54), and (56), so that a cabinet (50) may be placed on either side or on top or on bottom of a preexisting cabinet (50), and are dimensioned such that an access port (60) of one cabinet (50) lines up with an access port (60) of a second cabinet (50). Thus, access ports (60) are necessarily sealable by having a removably-mounted plate (not shown), so as to protect those not in use from the elements, etc.

It is to be understood that the present invention comprises, in part, combinations of "off-the-shelf" items. Thus, the vend control module of the present invention may contain a number of conventional components as more fully set forth in the discussion of FIG. 3 below.

Figure 3:
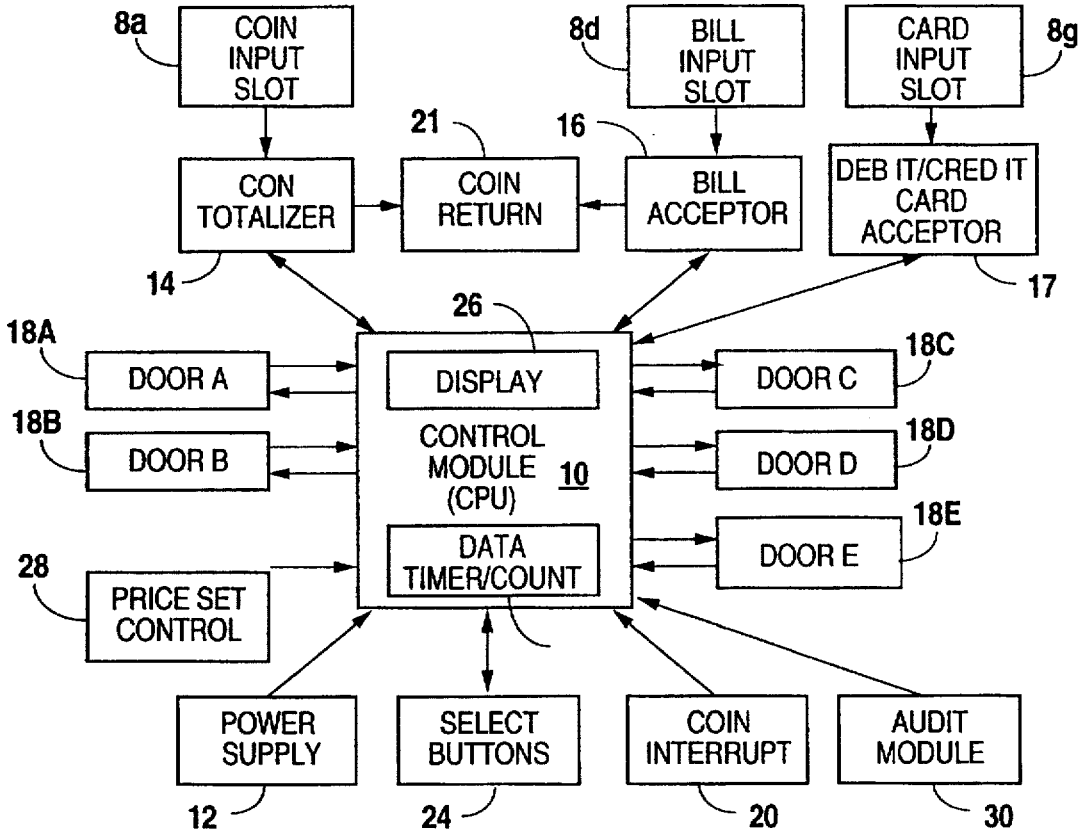
FIG. 3 is a block diagram illustrating the association of the elements of the present invention arranged about the central processor unit (CPU) of the vend control module.

Turning now to FIG. 3 it can be seen how the various components of the present invention combine to provide a vend control module with the capability of accepting and validating coins, bills, and/or debit/credit cards totalizing and displaying the amount of money inserted, providing for selected door options, a multiplicity of pricing capabilities, and a coin return function. More specifically, it is seen how the vend control module of the present invention has a central processor that is capable of receiving and processing electrical signals from various components and performing the various functions of the present invention including sending an electronic signal to a selected one of a multiplicity of remote doors to release a mechanism locking the door, thereby allowing the consumer access to the cabinet thereof.

Control module/central processing unit (CPU) (10) of the present invention is powered by a D.C. or A.C. power supply (12). Since most environments in which rack (1) or (1a) operate are out of doors and away from or inconvenient to A.C. power supplies, the preferred embodiment anticipates a D.C. power supply such as those provided by typical batteries of 12 volts D.C. CPU (10), thus powered in a typical transaction, receives input signals from coin totalizer (14) activated by the input of a coin in coin slot (8a) and is capable of determining the denomination and validity of the coin inserted therein. Invalid coins are rejected. Valid coins are identified with a signal responsive to a specific denomination input into central processing unit (10). A similar process could occur through bill acceptor (16) and bill input slot (8d) and through debit/credit card acceptor (17) and card input slot (8g).

It is to be noted that, although FIG. 3 illustrates central processing unit (10) separate and apart from coin totalizer (14), bill acceptor (16), and there are, in fact, off-the-shelf products that will combine functions of coin totalizer (14) with those of CPU (10). One such product is manufactured by Mars and marketed as Model MC 5920. Set forth below in Table 1 is a listing of each of the major components of FIG. 3, including a typical model and source for such components.

Thus, CPU (10) of the present invention provides the following functions: Receiving coins, bills and/or debit/credit cards (when integral with coin totalizer (14) and/or bill acceptor 16); and/or card acceptor (17) converting the coins/bills/credits into electronic signals specific to the denomination of the coins/bills/credits received; and processing that signal in a manner set forth in detail below.

The basic function of coin totalizer (14), bill acceptor (16), and card acceptor (17) is to translate the coins/bills/credits received therein into an electronic signal to be processed by control module (10). At the same time, coin totalizer (14), bill acceptor (16), and card acceptor (17) can recognize bogus money or cards and reject the same. CPU (10) will compute the total monies input and signal display (26) with the running total of the amount received. With the consumer selecting from button select panel (8e in FIG. 1), each selection representing a specific door and item price, CPU (10) will provide an unlock signal to the door selected (18a–88e) when the totalized sum is equal to or greater than the sum required for the paper contained within the door selected (18a–18e) by the consumer.

TABLE 1

| Item No. | Description | Manufacturer/Model No./Comments |
|---|---|---|
| 10 | CPU, Microprocessor | Kaspar Wire Works |
| 12 | 24-Volt DC Power Supply | ACME Electric, CPS30-24/28 |
| 14 | Coin Totalizer/ Acceptor | Mars Electronics, MC5920 |
| 16 | Bill Acceptor, Validator | Mars Electronics, VFM1 |
| 18 | DC Solenoid for latch | Magnetic, SCA3817 |
| 20 | Coin Interrupt Means | Integral with above Mars MC5920 |
| 21 | Coin Changer/Return | Integral w/CPU above Mars MC5920 |
| 22 | Data Timer/Counter | Integral w/CPU above |
| 24 | Select Buttons (A, B, C, D & E) | Grayhill, 87 Series |
| 26 | Display | Std. 3 digit dollar display |
| 28 | Price Settings (A, B, C, D & E) | Std. Multi-position switch |

At any time prior to insertion of monies or credits of a sum sufficient to purchase the least expensive paper, the consumer can press a coin interrupt button (8b) in (FIG. 1) which will signal CPU (10) to release any coins held in temporary escrow and reset the amount of monies received to zero. It is further seen in FIG. 3 how CPU (10) may provide an unlock signal when the sum from totalizer (14), bill acceptor (16), or card acceptor (17) reaches a total preselected by way of select buttons (24). Thus, an appropriate unlock signal is relayed to one of the preselected doors (18a–18e) that corresponds to a specific select button (24). At the same time, display (26) is provided with a message to indicate the door selected and a "ready" message to alert the consumer that the unlock signal has been sent, and that the door is unlocked and ready for the vend to occur.

The unlocking of door (18a–18e) will provide the consumer access to the interior of the selected cabinet, allowing him to withdraw the paper of his choice. At the same time, the initiation of the physical motion of opening the door (or in an alternate embodiment, closing the door) will provide a vend signal to CPU (10) that will in turn store in its memory a door opening count, thus giving a total door-by-door opening for each of doors (18a–18e). The switch activated vend signal at doors (18a–18e) further provides CPU (10) with the signal to clear display (26) and totalizer (14), bill acceptor (16), and card acceptor (17) release escrowed money to a vault (not shown) and initiate a sleep mode.

The system of the present invention disclosed particularly in FIG. 3 lends itself to both the maintenance of audit records based upon data collected by control module (10) and to the external reprogramming of vend control information through control module (10). The collection of audit information and the reprogramming of the control module is achieved by way of audit module (30). Audit module (30) may typically be the combination of a communications port and a data collection unit of the type disclosed in U.S. Pat. No. 5,036,966, issued to Kaspar, et al on Aug. 6, 1991. Such use of a central processor unit as in control module (10) in the present invention coupled with a portable data collection unit as shown in the Kaspar patent described above allows for the collection of audit information regarding vends and monetary transactions, as well as reprogramming of control module (10) so as to change the standard vending parameters such as price, volume of vend, etc.

Figure 4:
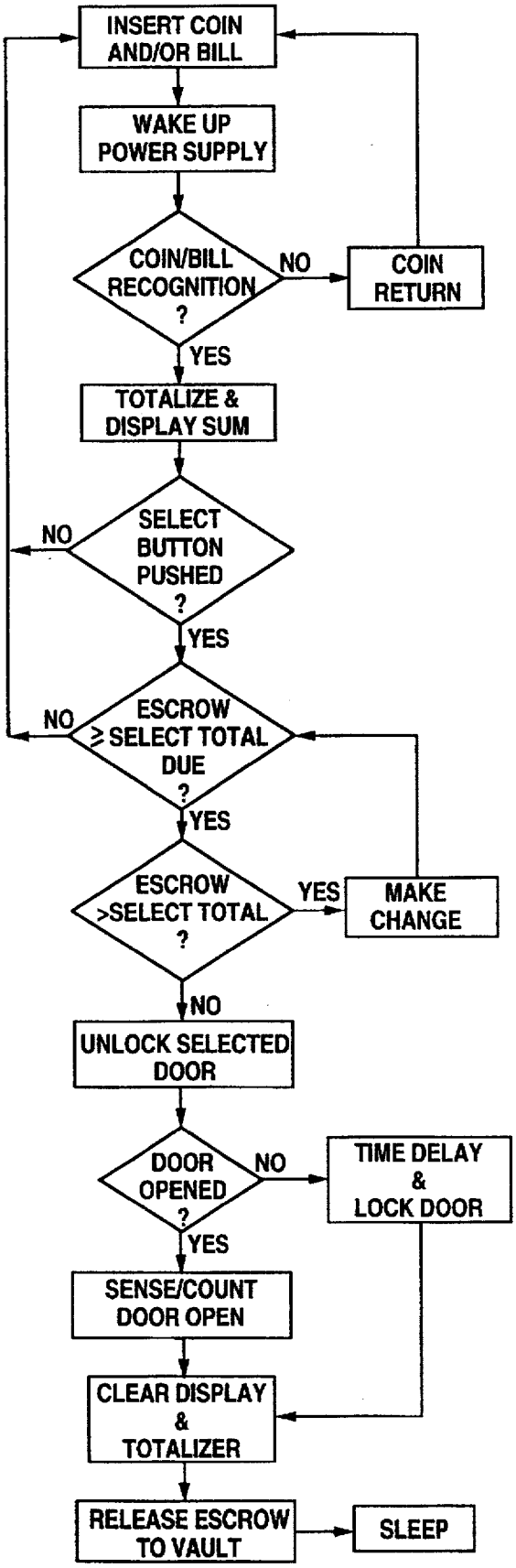
FIG. 4 is a flow chart illustrating the sequence of steps involved in the operation of the present invention.

FIG. 4 illustrates a flow chart showing the operations for utilizing the invention of the present disclosure. The sequence of steps disclosed in FIG. 4 is based upon the ordinary use of coins and/or bills as the transactional medium even though the process is easily translatable to the use of a debit/credit card. Reference in FIG. 4 to coins and/or bills could appropriately translate into debits and/or credits and magnetic card usage.

FIG. 4 illustrates the operations which begin with the insertion of, for example, a coin into the coin-control module and conclude with the opening of a door and the removal by the consumer of the newspaper within a cabinet of the rack. Upon insertion of the coins and/or bills a "wake up" signal is directed to the CPU and the money receiving apparatus will make an initial determination as to the validity of the money. If either the coin or the bill is not valid it will be returned via coin return or bill reject; if valid, the money will be held in escrow.

If the coin and/or bill are valid, the coin totalizer and bill acceptor will read the value of the money and signal the CPU with a translated value of the money inserted. The CPU/totalizer unit will signal display of the sum of money thus far inserted.

The consumer is required to select a button that will correspond to a particular cabinet door and the price of the enclosed paper, associated with the consumer's choice. The select button will signal the CPU/totalizer as to the door chosen, the CPU/totalizer having information stored therein defining the price total for that door (total amount of coinage required before the open signal can be initiated), as well as the particular door to which the open signal must be sent. There is typically a button corresponding to each door, and numbered with the appropriate door/cabinet number or having on or near it the particular name of the newspaper with which each cabinet is associated. Thus, a select button will provide the CPU/totalizer unit with a specific total, which may be the same for more than one door, as well as the particular door to which the unlock signal will be sent. Therefore, the CPU/totalizer unit will continue to measure the total denomination of coinage (meaning total coins and bills inserted) and compare this total to the selected total. When the escrow total is equal to or greater than the selected total, the CPU will send out the door unlock signal if the unit is in an "exact change" mode If in "change mode", the CPU will make a determination of whether or not the escrow total is more than the selected total, in which case the CPU will determine the amount of change to be made and signal for change return while signalling the totalizer of the same until the escrow total is equal to the selected door total.

When the vend door is physically opened two actions will occur—a switch means will send a signal back to the CPU which will clear the display and clear the totalizer and at the same time trigger a door count that will be recorded in memory for later recall.

Note in FIG. 4 that the consumer may press the coin interrupt button before pushing the select button and may have the coins inserted returned. That is, the system illustrated in FIG. 4 is an "escrow to select" system, meaning that the consumer can receive the money he has inserted by pressing the coin interrupt button until they have pushed the select button. An alternate preferred embodiment would provide for an "escrow until vend" which would allow the consumer to get his money back by pressing the coin interrupt button as long as he has not put in the minimum coinage necessary for the lowest price newspaper. In an "escrow until vend" mode, once the minimum vend price is received, there can be no more coin interrupt cycle.

Also, as can be appreciated in FIG. 4, a "wake up" power supply signal can be provided between the insert coin and/or bill action and the coin/bill recognition step. There are a number of ways in which this "wake up" signal can be provided. One is described in U.S. Pat. No. 5,036,966, assigned to the Assignee of the present invention, that provides for a "wake up" lever operated by the passage of coin in the coin chute to signal the power supply to a "wake up" mode providing full power to the CPU. If such a "wake up" signal is used, upon door opening the CPU may provide a second signal to put the circuit back into the "sleep mode". Alternately, this return to the "sleep mode" could occur automatically, on a timed basis.

Figure 6:
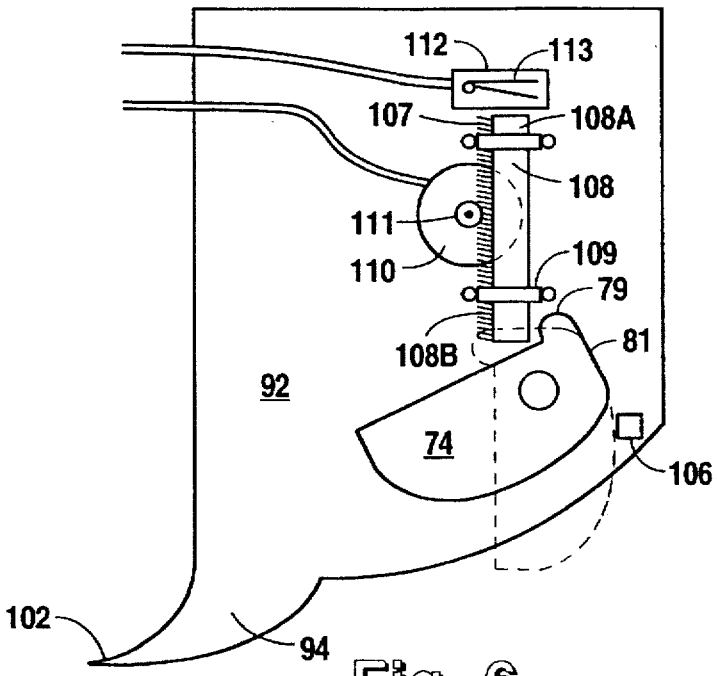
FIG. 6 is a side elevational view of an alternate preferred embodiment of the remote latch and locking mechanism of the present invention.
Figure 5:
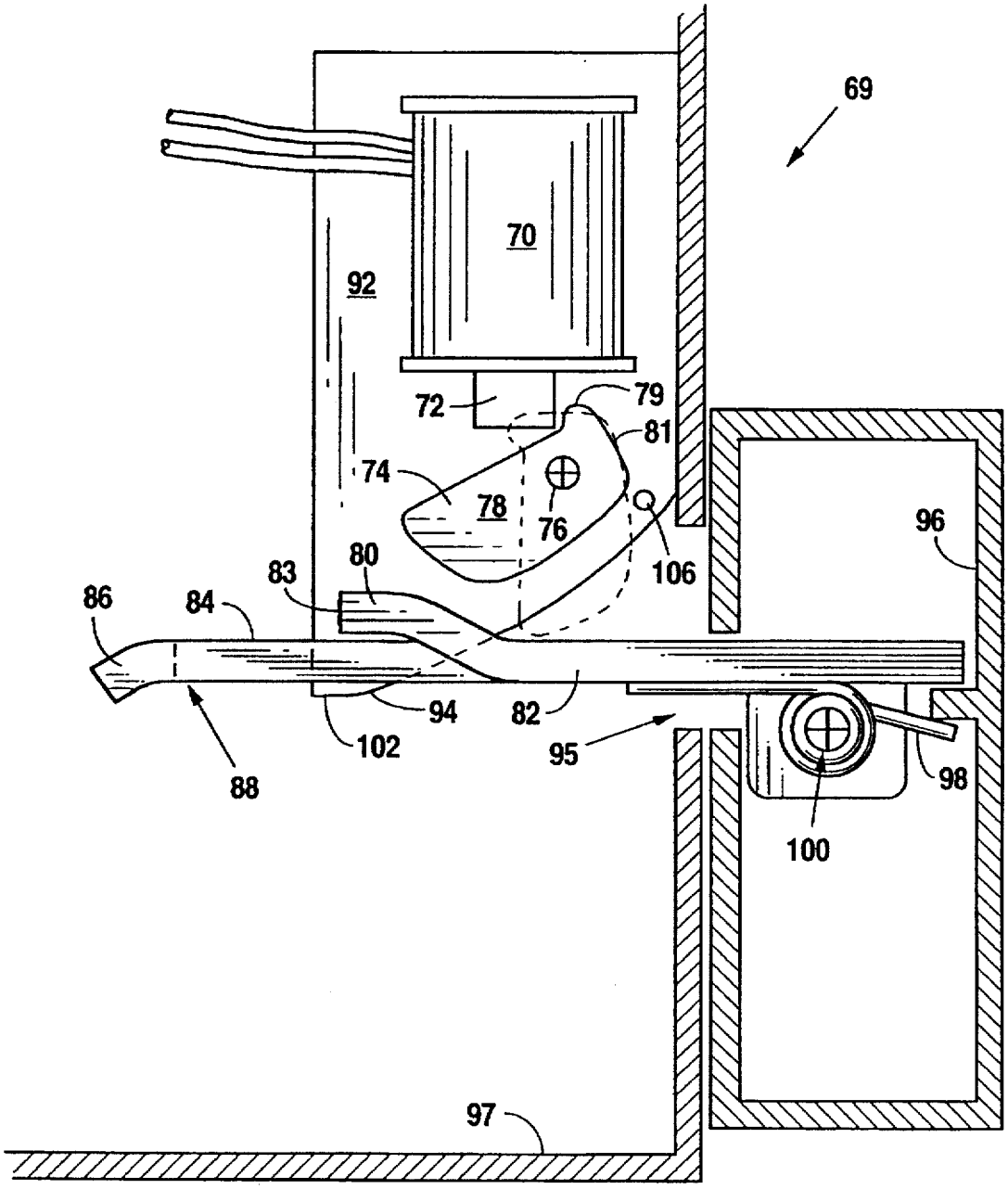
FIG. 5 illustrates a cut-away side elevational view of a preferred embodiment of the remote latch and locking mechanism of the present invention.
Figure 7:
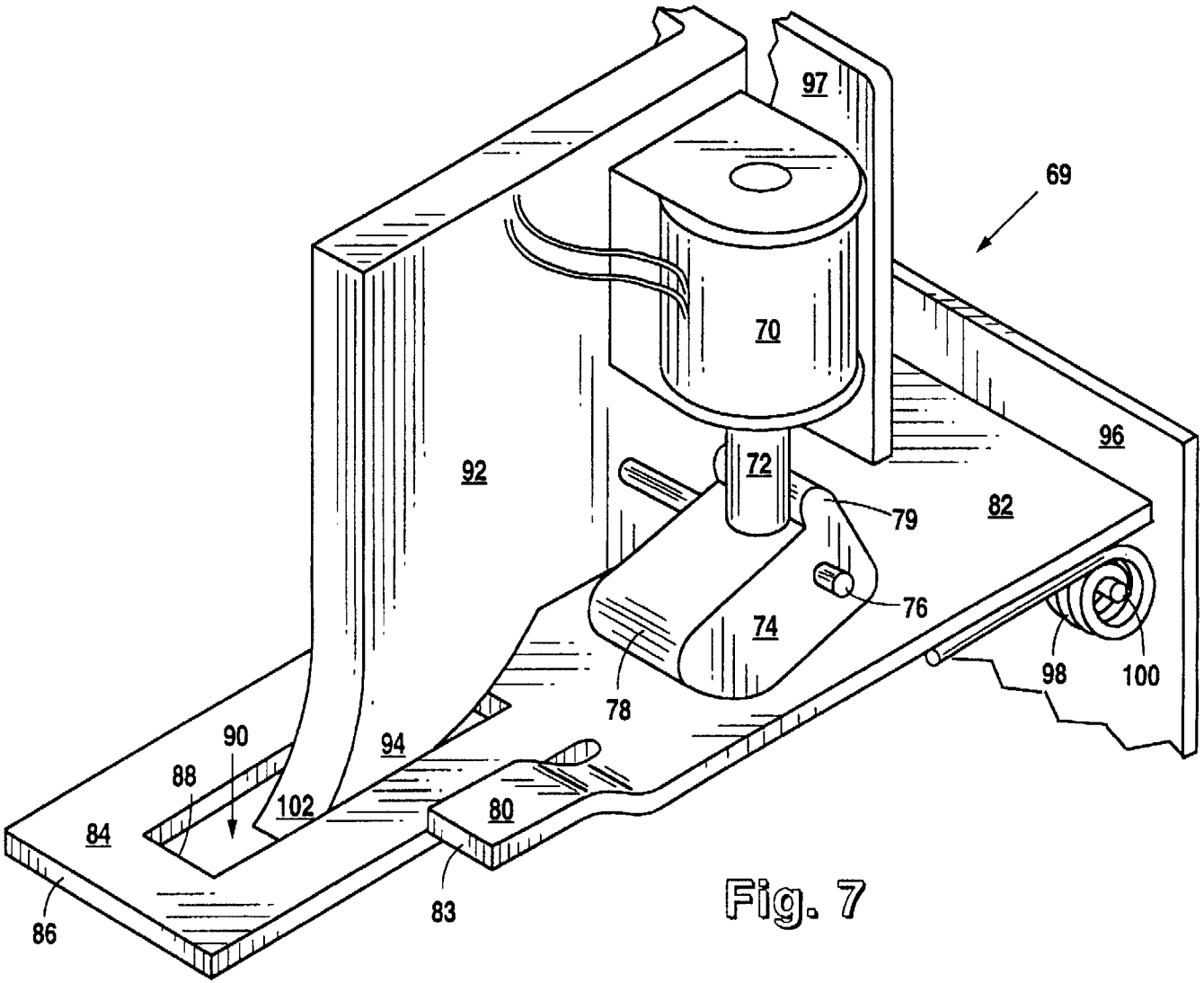
FIG. 7 is a cut-away perspective view of the remote latch and locking mechanism of the present invention shown in FIG. 5.

FIGS. 5, 6, and 7 detail the nature of the present invention's remote door latching and locking mechanism. Specifically, FIGS. 5, 6, and 7 illustrate remote latching mechanism (69) cooperating with door (96). Latching mechanism (69) receives an electrical pulse from a remotely-located vend control module to unlatch locked door (96) in response thereto.

The embodiment illustrated in FIGS. 5 and 7 shows solenoid coil (70) located on mounting plate (92) and positioned such that plunger (72) of solenoid coil (70) is vertically aligned. Thus, under the impetus of gravity, plunger (72) is normally biased in a downward position as illustrated in FIGS. 5 and 7. Cooperating with plunger (72) is cam (74) articulating on pivot point (76) and having a weighted or lobed end (78) and an engagement lip (79).

Cam (74) operatively engages locking plate (82) as more fully set forth below. As can be seen in FIGS. 5 and 7, locking plate (82) has integral therewith and extending therefrom, raised arm (80) and locking arm (84). Locking arm (84) has leading edge (86) and trailing edge (88), the latter in part defining locking slot (90). Thus locking plate (82) has two arms extending inward (towards the interior of the cabinet), a raised portion defining raised arm (80) which is designed to engage cam (74) when door (96) is opened and locking arm (84) designed to engage hooked portion (94) of plate (92) when door (96) is moved between an open and closed position.

As can be seen in FIGS. 5 and 7, as door (96) is pulled away from rack body (97), locking lip (102) of hooked portion (94) engages an interior trailing edge (88) of locking slot (90) (shown best in FIG. 7) to prevent door (96) from being opened.

To unlock door (96), CPU (10) (see FIG. 3) located in vend control module (7) (see FIG. 1) electrically energizes solenoid coil (70). Coil (70), so energized, retracts plunger (72). Prior to being retracted, plunger (72), in its locking position, as illustrated by solid lines in FIGS. 5 and 7, held cam (74) in a "loaded" position by engagement with engagement lip (79). However, when solenoid coil (70) is energized, plunger (72) is retracted (moves upward) past engagement lip (79) allowing cam (74) to pivot downward. The pulse to solenoid (70) is only momentary and once de-energized allows plunger (72) to fall and rest on top surface (81) of engagement lip (79) as illustrated with the dashed lines in FIG. 5. Thus, the unlock signal has momentarily energized coil (70), whose plunger (72) moves upward to allow weighed cam (74) to rotate about pivot (76) and to come to rest in a vertical position.

At this point, the consumer applies force to open door (96) outward thereby allowing lobed end (78) of cam (74) to engage raised arm (80) causing trailing edge (88) to be depressed, and clear locking lip (102) to allow door (96) to open fully. Stop bumper (106) will limit the rotation of cam (74) and impede engaging earn (74) as it rotates past a vertical position.

As can be seen in FIGS. 5 and 7, locking plate (82) must be able to articulate rotationally in an anti-clockwise position from the perspective illustrated in FIG. 5. This is done by providing a spring or other bias means (98) and pivotally attaching locking plate (82) to pivot point (100) about which it can rotate, on door (96). Thus, in closing door (96), locking plate (82) passes through slotted opening (95) in rack body (97). Leading edge (86) of locking arm (84) is depressed by engagement with hooked portion (94) of plate (92) until it passes trailing edge (88) where it will spring upward under the urging of spring (98) to prevent the door from being reopened without a new unlock signal. Leading edge (83) of raised arm (80) engages cam (74) causing the cam to rotate clockwise as viewed in FIG. 5 and resets plunger (72) under engagement lip (79) where plunger (72) is held in place by gravity and cam (74) is held in its "loaded" position by plunger (72) engagement with engagement lip (79).

FIG. 6 illustrates an alternate preferred embodiment of remote latch (69) of the present invention. More particularly, FIG. 6 illustrates a means for engaging and disengaging cam (74) comprised of mounting plate (92), having rod (107) with rack (108) formed thereupon. That is, rack (108) is integral with rod (107), rod (107) being vertically mounted to plate (92) by guide brackets (109). Rod (107) is actuated by gear (111) driven by D.C. electric motor (110), energized upon a signal from CPU (10) (see FIG. 3). Upon energization of electric motor (110), rotation of gear (111) engaging rack (108) raises rod (107) which is held in place by guide brackets (109) attached to plate (92). As rod (107) lifts, it disengages cam (74) in the same fashion as plunger (72) in the previous embodiment. As rod (107) continues its upward travel it strikes reed (113) of limit switch (112), limit switch (112) is connected in series with motor (110) and de-energizing the same upon contact by removed end (108a) closing reed (113). The de-energization of D.C. motor (110) flows rod (107) to drop back until removed end (108b) contacts upper surface (81) of cam (74) as illustrated previously in FIG. 5. Return to a "loaded" position is achieved as with the previously described embodiment.

Thus the present invention describes a method and apparatus to control the selective unlocking of one of a multiple of door accessible newspaper vending cabinets (6a–6e) through a single vend control mechanism (7). The method provides for signaling a preselected door from a multiple of doors (18a–18e) to unlock when the proper total denomination of coins, bills, or credits has been inserted into the vend control mechanism (7). The apparatus provides for an electronic coin totalizer (14), a bill acceptor (16), a card acceptor (17), and a central processing unit (CPU) (10) to receive and process signals relating to total monies received and to selectively unlock one of a multiple of door-accessible cabinets (6a–6e), in response thereto.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position or manner in which the invention may be constructed or used.

Although the invention has been described in connection with the preferred embodiment, it is not intended to limit the invention to a particular form set forth, but on the contrary, it is intended to cover such alternatives, modifications, and equivalents as may be included within the spirit and the scope of the invention as defined by the appended claim.

I claims:

1. A device for vending one of a multiple of different newspapers under a centralized control, the device comprising:

a modular rack, said rack capable of receiving and retaining a plurality of like dimensioned modules;

an electric power supply;

a plurality of cabinet modules each having walls defining an enclosure and each capable of receiving therein a stack of newspapers, each of said cabinet modules similarly dimensioned to fit snugly together within said modular rack, each of said enclosures defined by said cabinet module walls being isolated one from another by said walls;

a plurality of doors, each in operative association with one of said cabinet modules for providing access to the interior of said cabinet module, each of said doors movable between a closed position and an open position, and providing access only to said cabinet module associated therewith;

a plurality of latch means, each in operative association with one of said doors for locking said door in said closed position;

a plurality of release means, each in operative association with one of said latch means, for unlocking said latch means in response to an electronic signal;

a vend control module dimensioned to fit within said modular rack, said vend control module having a central processing unit capable of receiving monies therein and totalizing said monies received, said vend control module further comprising a consumer-accessible means to select one of said plurality of cabinet modules, said cabinet module selected containing a desired newspaper, said central processing unit capable of electronically signalling said release means associated with said selected cabinet module when said total monies received therein is sufficient to cover a preselected price associated with said desired newspaper.

2. The device of claim 1 further comprising a plurality of sensing means, each in operative association with one of said doors, for sensing a motion of said door from said closed to said open position, and signalling said central processing unit of said vend control module upon sensing such motion.

3. The device of claim 1 further comprising means for selectively setting a total of monies to be received for each of said cabinet modules before said central processing unit signals said release means associated with said cabinet module.

4. The device of claim 1 wherein said vend control module is adapted to receive and electronically totalize coinage, and to further provide an electronic signal specific to a denomination of each of a plurality of different denomination coins, said signal for processing by said central processing unit.

5. The device of claim 1 wherein said vend control module is adapted to receive and electronically totalize paper bills, and to further provide an electronic signal specific to a denomination of each of a plurality of different denomination bills, said signal for processing by said central processing unit.

6. The device of claim 1 wherein said central processing unit includes means to calculate overage when said total monies inserted therein is greater than said preselected price associated with said desired newspaper and further having means to return said overage to a consumer.

7. The device of claim 1 wherein said vend control module further comprises means to detect and reject invalid money, said invalidity detection means also capable of returning said invalid money to a consumer.

8. The device of claim 1 further comprising means to wake-up said central processing unit, said wake-up means triggered by insertion of money into said vend control module.

9. The device of claim 2 wherein said central processing unit includes a memory means for receiving signals from each of said motion sensing means and separately storing a cumulative total of said signals for each of said cabinets.

10. The device of claim 1 wherein said vend control module includes a display in association with said central processing unit for displaying pricing information and information regarding money received by said vend control module.

11. The device of claim 2 wherein said vend control module further comprises a coin interrupt means in operative association with said central processing unit and capable of returning said money inserted into said vend control module prior to said motion of any of said doors.

12. A method of selecting and vending a newspaper from one of a plurality of separate cabinets, each cabinet having a [latch-controlled] door capable of preventing access to said cabinet, and an electronically activated release mechanism for [unlocking] *releasing* said door, said release mechanisms controlled from a single remotely located vend control cabinet, the method comprising the steps of:

selecting one of said plurality of different newspapers:

inserting money into said vend control cabinet;

testing the validity of said money;

rejecting invalid money;

transferring valid money to an escrow storage location in said vend control cabinet;

totalizing said valid money received;

comparing a total of said money in said escrow to a preset price of said selected newspaper;

generating [an unlock] *a* signal to said release mechanism associated with said cabinet containing said selected newspaper when said escrow total is equal to or greater than said preset price;

opening said door to said cabinet and removing said selected newspaper;

signalling said vend control module that said door has been opened and counting a number of said door openings; and transferring said valid money received from said escrow to a money vault located in said vend control cabinet.

13. A device for vending a newspaper from one of a plurality of separate cabinets, the device comprising:

a frame;

a power supply;

at least two similarly dimensioned newspaper cabinets, each positioned on said frame and capable of receiving therein a stack of newspapers, each of said newspaper cabinets comprising:

a door providing access to the interior of said cabinet, said door movable between a closed and an open position;

[latch means for looking said door in said closed position;]

release means for [unlocking] *releasing* said [latch means] *door* in response to an electronic signal;

a vend control cabinet dimensioned similar to said newspaper cabinets and positioned on said frame, said vend control cabinet comprising:

money receiving means;

price setting means for selectively setting a preset price for each of said newspapers;

a central processing unit for totalizing said monies received and electronically signaling said release means when said total money received is equal to or greater than said preset price; and an electrical conductor between said vend control cabinet and said release means of each of said cabinets.

14. The device of claim 13 wherein each of said newspaper cabinets further comprises sensor means for sensing movement of said door and signalling said central processing unit.

15. The device of claim 13 wherein said money receiving means is adapted to receive and electronically totalize coinage, and to provide an electronic signal specific to a denomination of each of a plurality of different denomination coins, said signal for processing by said central processing unit.

16. The device of claim 13 wherein said money receiving means is adapted to receive and electronically totalize paper bills, and to provide an electronic signal specific to a denomination of each of a plurality of different denomination bills, said signal for processing by said central processing unit.

17. The device of claim 13 wherein said central processing unit calculates an overage when said total money inserted therein is greater than said preset price and said vend control cabinet further comprises means to return said overage to the consumer.

18. The device of claim 13 wherein said money receiving means further comprises means to detect and reject invalid money and said vend control cabinet further comprises means to return said invalid money to the consumer.

19. The device of claim 13 wherein said money receiving means further comprises means to wake-up said central processing unit, said wake-up means triggered by insertion of money into said money receiving means.

20. The device of claim 14 wherein said central processing unit includes a memory means for storing a cumulative total of said sensed movements of each of said doors of said cabinets.

21. The device of claim 13 wherein said vend control cabinet further comprises a display in association with said central processing unit for displaying said preset price information and information regarding money received by said money receiving means.

22. The device of claim 13 wherein said vend control cabinet further comprises coin interrupt means in operative association with said central processing unit which, upon activation by the consumer prior to said door movement, causes a return of said money received by said money receiving means.

* * * * *